(12) United States Patent
Ogino et al.

(10) Patent No.: US 8,387,255 B2
(45) Date of Patent: Mar. 5, 2013

(54) FINE PATTERN MOLD

(75) Inventors: Masahiko Ogino, Hitachi (JP); Mitsuru Hasegawa, Hitachi (JP); Kenya Ohashi, Hitachinaka (JP); Akihiro Miyauchi, Hitachi (JP); Hitoshi Suzuki, Hitachi (JP); Toshio Haba, Tokai (JP); Haruo Akahoshi, Hitachi (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 13/307,042

(22) Filed: Nov. 30, 2011

(65) Prior Publication Data

US 2012/0067507 A1    Mar. 22, 2012

Related U.S. Application Data

(63) Continuation of application No. 12/129,881, filed on May 30, 2008, now Pat. No. 8,083,515.

(30) Foreign Application Priority Data

May 31, 2007 (JP) ................................. 2007-145379

(51) Int. Cl.
*G11B 7/26* (2006.01)
*B29C 33/38* (2006.01)
*B29C 59/04* (2006.01)

(52) U.S. Cl. .................. 29/895.212; 29/895.21; 492/18; 492/30; 425/471

(58) Field of Classification Search ............ 492/18, 492/17, 30, 46; 29/895.2, 895.21, 895.212, 29/895.3, 895.32, 447; 101/22, 23, 25; 425/471, 425/363
See application file for complete search history.

(56) References Cited

U.S. PATENT DOCUMENTS

| | | | |
|---|---|---|---|
| 3,072,519 A | 1/1963 | Salzman | |
| 4,231,730 A | 11/1980 | Birt | |
| 4,723,903 A * | 2/1988 | Okazaki et al. | 425/385 |
| 4,793,792 A * | 12/1988 | Akino | 425/385 |
| 5,310,333 A * | 5/1994 | Sato et al. | 425/363 |
| 5,368,789 A | 11/1994 | Kamitakahara et al. | |
| 5,480,596 A | 1/1996 | Okubo et al. | |
| 6,393,226 B1 * | 5/2002 | Charlebois et al. | 399/12 |
| 6,716,017 B2 * | 4/2004 | Papadopoulas | 425/194 |
| 7,632,628 B2 * | 12/2009 | Iida et al. | 430/321 |
| 7,654,815 B2 * | 2/2010 | Hasegawa et al. | 425/363 |

FOREIGN PATENT DOCUMENTS

| | | |
|---|---|---|
| EP | 481753 | 4/1992 |
| JP | 63-105198 | 5/1988 |
| JP | 01-253422 | 10/1989 |
| JP | 4-6640 | 1/1992 |
| JP | 06-020308 | 1/1994 |
| JP | 8-190739 | 7/1996 |
| JP | 8-249729 | 9/1996 |
| JP | 10-249916 | 9/1998 |
| JP | 2003-053834 | 2/2003 |

OTHER PUBLICATIONS

JP Office Action of Appl. No. 2007-145379 dated Jul. 30, 2009 with translation.

* cited by examiner

*Primary Examiner* — David Bryant
*Assistant Examiner* — Jason L Vaughan
(74) *Attorney, Agent, or Firm* — Antonelli, Terry, Stout & Kraus, LLP.

(57) ABSTRACT

The fine pattern mold that includes a roll, a buffer tube with inner peripheral surface is in contact with an outer peripheral surface of the roll, and a stamper tube in which its inner peripheral surface is in contact with an outer peripheral surface of the buffer tube and a fine concave/convex pattern is formed on its outer peripheral surface, wherein the buffer tube has a larger coefficient of linear expansion and a smaller elastic modulus than those of the stamper tube.

3 Claims, 9 Drawing Sheets

FINE PATTERN MOLD

CLAIM OF PRIORITY

This application is a continuation of application Ser. No. 12/129,881, filed on May 30, 2008, now allowed now U.S. Pat. No. 8,083,515, which claims the benefit of Japanese Application No. 2007-145379 filed on May 31, 2007 in the Japanese Patent Office, the disclosures of which are incorporated herein by reference.

BACKGROUND OF THE INVENTION

1. Field of the Invention

The present invention relates to a fine pattern mold in the shape of a roll for transferring a fine concave/convex pattern formed on its peripheral surface and a method for producing the fine pattern mold.

2. Description of the Related Art

In recent years, semiconductor integrated circuits have become finer and further integrated. As a pattern transfer technology for realizing it, in addition to a photo lithography technology and an electron-beam drawing technology, a nano imprint technology is proposed.

The nano imprint technology is a technology for transferring a pattern by debossing a fine pattern mold having the same fine concave/convex pattern as a pattern to be formed on a semiconductor substrate into a resist film layer formed on a surface of the semiconductor substrate. In this regard, if the fine pattern mold is in the shape of a roll, the fine pattern mold can be rolled and a pattern can be transferred continuously with ease.

For the continuous transfer, it is necessary to have a roll support and a stamper with a concave/convex pattern closely contact with each other, and a technology for fixing the stamper to the roll support with a larger coefficient of thermal expansion than that of the stamper is proposed, for example, in Japanese Unexamined Patent Publication No. H8-190739 (FIG. 9)

However, it was thought that when the roll support was heated and expanded, deformation of the stamper was caused and distortion might occur to the fine concave/convex pattern itself. Moreover, it was thought that when a substrate to which a pattern was transferred, such as a semiconductor substrate, had a level difference or the stamper was uneven in thickness, the stamper was not pressed to the substrate with a uniform pressure and a fine concave/convex pattern could not be transferred accurately.

It is therefore an object of the present invention to provide a fine pattern mold which can accurately transfer a fine concave/convex pattern without causing deformation in the fine concave/convex pattern itself, and a method for producing the fine pattern mold.

SUMMARY OF THE INVENTION

According to the present invention which has solved the above problem, there is provided a fine pattern mold comprising: a roll; a buffer tube whose inner peripheral surface is in contact with an outer peripheral surface of the roll; and a stamper tube in which its inner peripheral surface is in contact with an outer peripheral surface of the buffer tube and a fine concave/convex pattern is formed on its outer peripheral surface. Further, the buffer tube has a larger coefficient of linear expansion and a smaller elastic modulus than those of the stamper tube.

Moreover, according to the present invention, there is provided a method for producing the fine pattern mold, comprising the steps of: forming a stamper tube in which a fine concave/convex pattern is formed on its outer peripheral surface; forming a buffer tube, on a peripheral surface of a roll, having a larger coefficient of linear expansion and a smaller elastic modulus than those of the stamper tube; and fitting the stamper tube into the buffer tube while cooling the buffer tube.

According to the present invention, it becomes possible to provide a fine pattern mold which can accurately transfer a fine concave/convex pattern without causing deformation in the fine concave/convex pattern itself and to provide a method for producing the fine pattern mold.

DESCRIPTION OF THE PREFERRED EMBODIMENTS

Figure 1A:
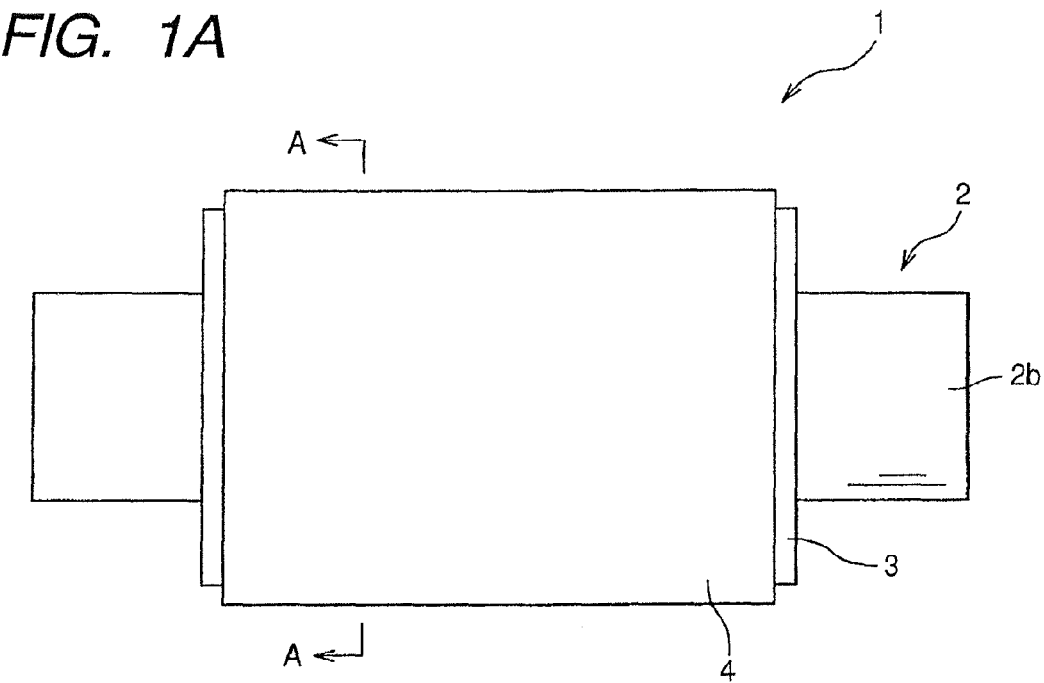
FIG. 1A is a front view of a fine pattern mold according to Embodiment 1 of the present invention and FIG. 1B is an A-A sectional view of FIG. 1A.

Now, referring to drawings, embodiments of the present invention will be described in detail. Also, like reference numerals refer to like parts in the drawings, and descriptions thereof will be omitted.

The buffer tube 3 has a larger coefficient of linear expansion and a smaller elastic modulus than those of the stamper tube 4. An elastic member can be used for the buffer tube 3.

In this regard, the coefficient of linear expansion is a value $\alpha$ defined by: $\alpha=(\delta 1/\delta\theta)/1$ ($\theta$: temperature of a member, 1: length of the member in a room temperature). Further, the elastic modulus is a constant showing a ratio of stress to strain, and obtained from the relationship between the stress and strain when the member is extended such as Young's modulus. To be specific, it is a value of physical properties showing the degree of resistance of a member to deformation, and when an elastic modulus is large, the member is hard in many cases.

Further, as for a material for the buffer tube 3, as long as it is a material whose coefficient of linear expansion is larger and elastic modulus is smaller than those of the stamper tube 4, there is no restriction in particular. Further, it is desirable that it is a material with a heat-resisting property and durability. Those that can be used are: silicone elastomer, dimethyl silicone rubber, fluorosilicone rubber, perfluoro rubber, and perfluoro phosphagen rubber. Further, a composite material in which a filler, glass fiber, etc. are blended to the above rubbers can be used.

The stamper tube 4 is formed by joining three stamper sheets 6 on which fine concave/convex patterns 4a are formed in a peripheral direction. Between end faces of the stamper sheets 6, a joint 10 is provided. With use of the joint 10, the stamper sheets 6 are mutually joined and connected.

The thickness of the stamper sheet 6 is not particularly limited, as long as it holds flexibility and is free from a fracture and wrinkle. Specifically, the thickness is more than 50 μm but no more than 100 μm.

The roll 2 is a cast processed into a columnar or cylindrical shape. It has predetermined hardness, and it can be rotated about a central axis. The roll 2 has a main part 2a whose outer peripheral surface is in contact with an inner peripheral surface of the buffer tube 3, and a roll shaft 2b which supports the main part 2a of the roll in a rotatable manner. Further, the roll shaft 2b is rotatably supported on bearings of an external device.

Although there is no restriction in particular for the quality of the material of the roll 2, an alloy such as a stainless steel, ceramics, an engineering plastic, etc. are preferred in terms of hardness and moldability.

Inside the roll 2, for example, inside the roll shaft 2b, a heating mechanism 2c is provided. As the heating mechanism 2c, a resistor, a coil for induction heating, a lamp for heating, etc. can be used. The heating mechanism 2c can heat the entire fine pattern mold 1. The heating mechanism 2c includes a mechanism which measures a surface temperature of the fine pattern mold 1 and adjusts it to a predetermined temperature.

At the time of the transfer, temperature control is performed case by case according to a substrate to which a pattern is transferred, particularly to a glass transition temperature of the substrate. In addition, it is desirable that a mechanism for allowing the temperature of the entire roll 2 to be uniform is provided inside the roll 2. As a mechanism for allowing the temperature of the entire roll 2 to be uniform, copper being a good conductor or a heat pump may be embedded covering full width of the roll 2.

The roll 2 has a smaller coefficient of linear expansion and a larger elastic modulus than those of the buffer tube 3. Moreover, the peripheral surface of the roll 2, especially the peripheral surface of the main part 2a of the roll is a mirror plane. Since the coefficient of linear expansion of the roll 2 is small and the elastic modulus is large on the mirror plane of the main part 2a of the roll, the mirror plane is not deformed easily.

Therefore, as a reference plane, it allows a crushed portion of the buffer tube 3 to be uniform all over its width. Further, it allows a fine concave/convex pattern to be accurately transferred covering all over the width.

Now, a method for producing the fine pattern mold 1 according to Embodiment 1 of the present invention will be described.

Figure 2A:
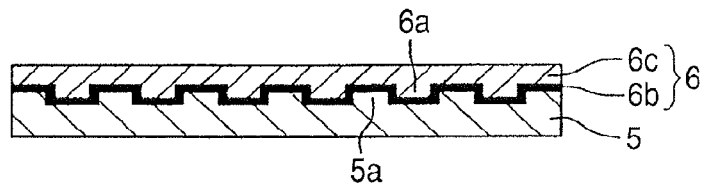
FIG. 2A is a view for illustrating a production method of the fine pattern mold of Embodiment 1 of the present invention, which is a sectional view of a master plate and a stamper sheet.

First, as shown in FIG. 2A, on the master plate 5 on which the fine concave/convex pattern 5a is formed, there are formed an non electrolytic plated layer 6b and an electrolytic plated layer 6c to be used as a stamper sheet (electroformed layer) 6. Thus, on the stamper sheet 6, as a concave/convex pattern 6a, a concave/convex pattern 5a on the master plate 5 is transferred and replicated.

The fine concave/convex pattern 5a serves as a fine pattern to be transferred onto the transfer substrate. The method to form the fine concave/convex pattern 5a on the master plate 5 is not part lithography, an electron-beam drawing method, etc., being chosen according to required processing precision.

Materials for the master plate 5 may be ones having required hardness and workability of required precision, such as a silicon wafer, various metal materials, glass, quartz ($SiO_2$), ceramics, plastics, etc. To be specific, preferred materials are silicon (Si), silicon carbide (SiC), silicon nitride (SiN), polycrystalline silicon (Si), glass, nickel (Ni), chromium (Cr), copper (Cu), and a material containing one or more kinds of the above.

Figure 2B:
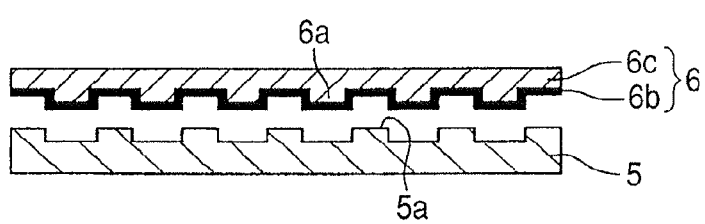
FIG. 2B is a view for illustrating the production method of the fine pattern mold of Embodiment 1 of the present invention, which is a sectional view of the master plate and the stamper sheet.

Next, as shown in FIG. 2B, the stamper sheet 6 is peeled from the master plate 5. Also, it is desirable to perform pattern-removing processing in advance on the surface of the master plate 5 for preventing its adhesion with the stamper sheet 6. The pattern-removing processing may be application of mold lubricant of a silicone system, a coupling agent of a fluorine system, etc. Formation of the stamper sheet 6 and the process of peeling are repeated, and the two or more stamper sheets 6 are formed. Also, the stamper sheets 6 are shaped into predetermined forms, respectively.

Figure 2C:
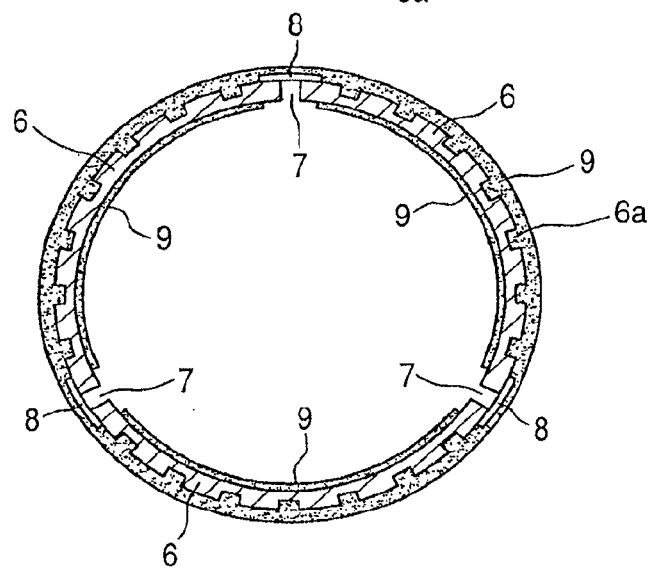
FIG. 2C is a view for illustrating the production method of the fine pattern mold of Embodiment 1 of the present invention, which is a sectional view of two or more stamper sheets fixed by a conductive member.

Next, as shown in FIG. 2C, in order that the surface on which the concave/convex pattern 6a is formed may be a peripheral surface, two or more stamper sheets 6 are joined by a conductive member 8 to be in a cylindrical shape. End faces of the stamper sheets 6 are fixed by the conductive member 8 while they are allowed to be close and opposing. Between the end faces of the stamper sheets 6, there is formed a slight gap 7.

Figure 2D:
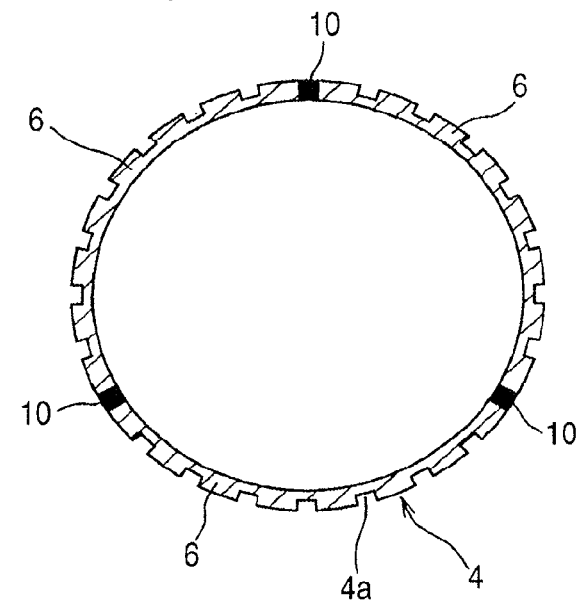
FIG. 2D is a view for illustrating the production method of the fine pattern mold of Embodiment 1 of the present invention, which is a sectional view of a stamper tube.

The whole area of the peripheral surface of the cylindrical form is covered with a masking tape 9 for plating. An inner peripheral surface is similarly covered with the masking tape 9 for plating but not entirely. The gap 7 is exposed and is not covered with the masking tape 9 for plating. Then, electrolytic plating is performed, the gap 7 is filled and, as shown in FIG. 2D, a joint 10 is formed in place of the gap 7. The three stamper sheets 6 are joined in a peripheral direction by the joint 10. Then, a stamper tube 4 where a fine concave/convex pattern 4a is formed on the peripheral surface is formed.

Figure 3A:
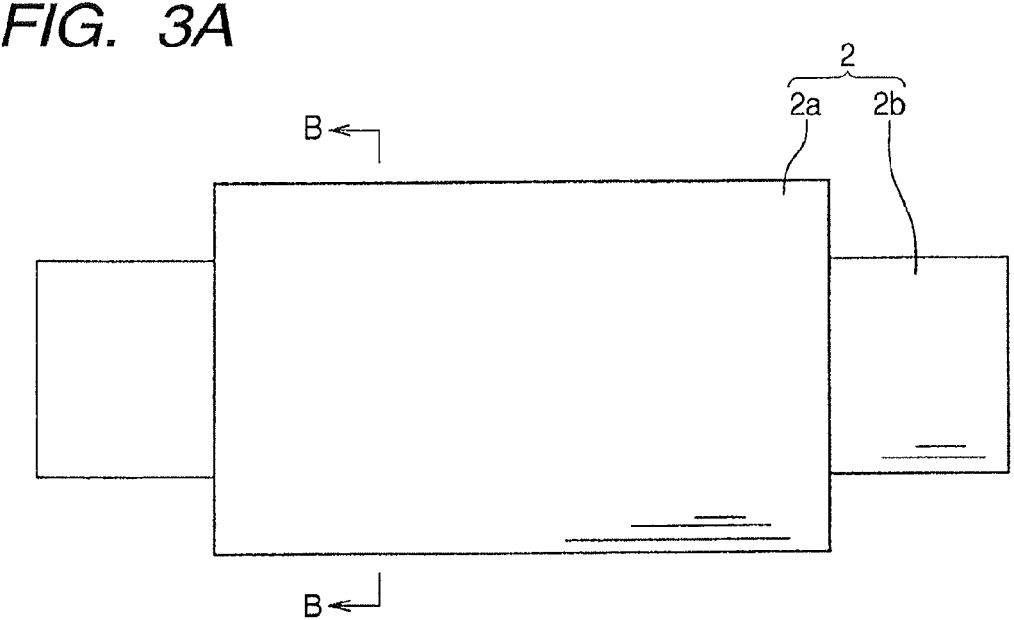
FIG. 3A is a front view of the fine pattern mold, being produced, of Embodiment 1 (of the present invention and FIG. 3B is an B-B sectional view of FIG. 3A.
Figure 3B:
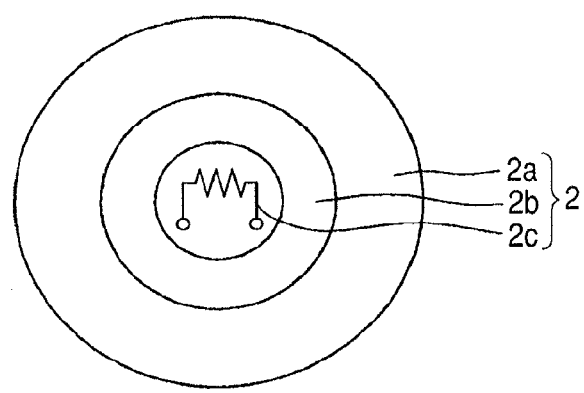

Next, a roll 2 is prepared. FIG. 3A is a front view of the roll 2, and FIG. 3B is an B-B sectional view of FIG. 3A.

Figure 4A:
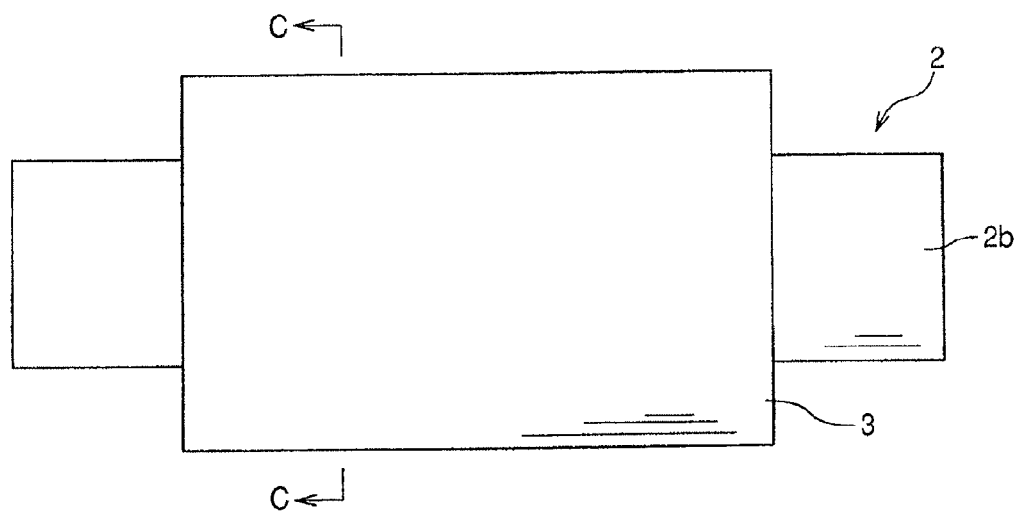
FIG. 4A is a front view of the fine pattern mold, being produced, of Embodiment 1 of the present invention.
Figure 4B:
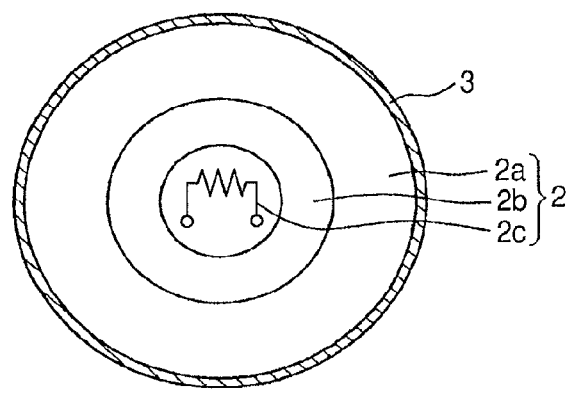
FIG. 4B is an C-C sectional view of FIG. 4A.

Next, as shown in FIGS. 4A and 4B, on the peripheral surface of the main part 2a of the roll 2, there is formed all over the periphery a buffer tube 3 which has a larger coefficient of linear expansion and a smaller elastic modulus than those of the stamper tube 4.

Figure 1B:
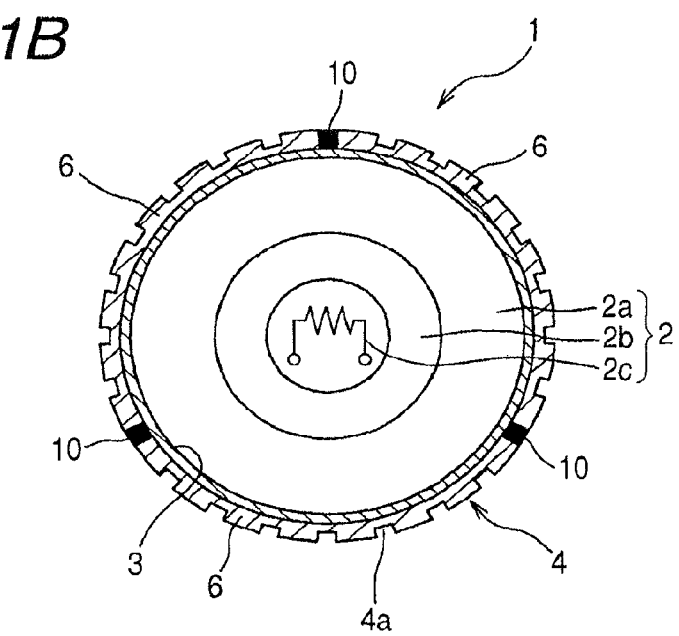

Finally, as shown in FIGS. 1A and 1B, the stamper tube 4 is fitted onto the buffer tube 3. If the stamper tube 4 is fitted while the buffer tube 3 is cooled to contract, the stamper tube 4 can be inserted easily. After the fitting, when the buffer tube 3 becomes at an ambient temperature, the buffer tube 3 expands again. As a result, the outer peripheral surface of the butter tube 3 is pressed to the inner peripheral surface of the stamper tube 4 to be in close contact.

In Embodiment 1, in order to prepare the master plate 5 on which the fine concave/convex pattern 5a is formed, a photo lithography process for semiconductor processing etc. may be used. In the photolithography process etc., a planar silicon wafer etc. are used, and the master plate obtained therefrom is also a planar leaf-like body.

Therefore, in order to produce a roll-like fine mold, two or more flexible stamper sheets 6 are formed from the master plate 5. Then, by joining the stamper sheets 6 while carving them, the stamper sheets 6 are formed into a single stamper tube 4. Since it is a stamper "tube" 4, it can be rolled on the substrate to which a pattern is transferred and the fine concave/convex pattern can be transferred continuously.

In the transfer onto the substrate to which a pattern is transferred by the stamper tube 4, first, a resist layer is formed on the substrate. Then, a fine concave/convex pattern is transferred onto the resist layer. Further, using the resist layer as a mask, the substrate is processed.

Finally, the fine concave/convex pattern is transferred onto the substrate. The resist layer is a resin layer and is softened at a temperature higher than a glass transition temperature. For this reason, when the temperature of the resist layer is allowed to be higher than the glass transition temperature and the fine concave/convex pattern is transferred to the resist layer, the fine concave/convex pattern can be transferred easily and accurately.

During the transfer, in order to set the temperature of the resist layer to the one higher than the glass transition temperature, in addition to heating the substrate on the resist layer side, the stamper tube 4 in contact with the resist layer is heated. The temperature of the stamper tube 4 is raised by the heating from the heating mechanism 2c (see FIG. 1B).

In Embodiment 1, the buffer tube 3 has a larger coefficient of linear expansion and a smaller elastic modulus than those of the stamper tube 4. Further, with the buffer tube 3 cooled to a temperature lower than the glass transition temperature or an ambient temperature and contracted, the stamper tube 4 is fitted into the buffer tube 3. Therefore, after the fitting, when the temperature of the buffer tube 3 is raised to the glass transition temperature or higher or up to the ambient temperature, the buffer tube 3 is more expanded than the stamper tube 4.

As a result, the outer peripheral surface of the buffer tube 3 is pressed to an inner peripheral surface of the stamper tube 4 to be tightly fitted with each other. Further, the buffer tube 3 is restricted by the stamper tube 4 such that its outer peripheral surface is not moved in a radial direction. Therefore, the inner peripheral surface of the buffer tube 3 is also pressed to the outer peripheral surface of the roll 2 to be tightly fitted.

As a result of the above, the stamper tube 4 can reliably be fixed to the outer peripheral surface of the roll 2 through the buffer tube 3, and the fine concave/convex pattern 4a can be transferred accurately.

As the buffer tube 3 expands, a tensile stress acts on the stamper tube 4 in a peripheral direction, and the strength of the stress is applied uniformly all over the periphery in a peripheral direction. For this reason, the stress is prevented from occurring locally, and fine concave/convex patterns there are prevented from being deformed.

If the stress takes place along the periphery uniformly, the maximum value of the stress is lowered, and the deformation of the fine concave/convex patterns can be made small. Moreover, the uniformly produced stress deforms the fine concave/convex pattern 4a uniformly. Therefore, it becomes possible to correct the shape of the fine concave/convex pattern 4a, taking the deformation into consideration.

Further, even when there is a level difference in the substrate to which a pattern is transferred or even when the thickness of the stamper tube 4 is uneven, the buffer tube 3 is elastically deformed at the time of the transfer. Accordingly, the stamper tube 4 also is deformed along the substrate to which a pattern is transferred, preventing the application of the pressure to be biased to a certain part of the substrate or a certain part of the stamper tube 4.

As a result, the pressure is distributed and applied to an entire width of the substrate to be pressed and an entire width of the stamper tube 4 to be pressed. Then, the stamper tube 4 is pressed to the substrate with a uniform pressure, pressing the entire width of the stamper tube 4 reliably to the entire width of the surface of the substrate, making it possible to accurately transfer the fine concave/convex pattern with high precision.

The fine pattern mold 1 of Embodiment 1 can be applied to the applicable field of nano imprint technology, such as various bio-devices, immunity system analysis equipment including DNA chips (disposable DNA chips etc.), semiconductor multilevel interconnection, printed circuit boards, RF MEMS, optical storage, magnetic storage, optical devices (waveguide, diffraction grating, micro lens, polarization elements, etc.), photonic crystals, substrates for organic EL lighting, LCD displays, FED displays, and energy-related devices (solar cells, fuel cells, etc.).

Figure 6A:
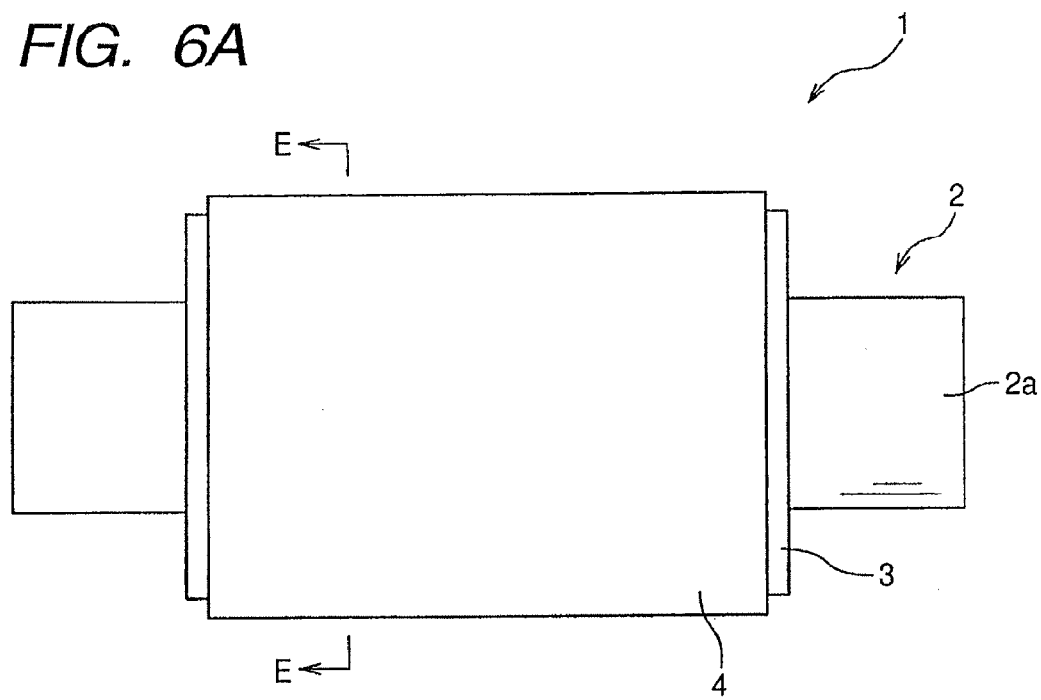
FIG. 6A is a front view of a fine pattern mold of Embodiment 3 of the present invention and FIG. 6B is a E-E sectional view of FIG. 6A.
Figure 6B:
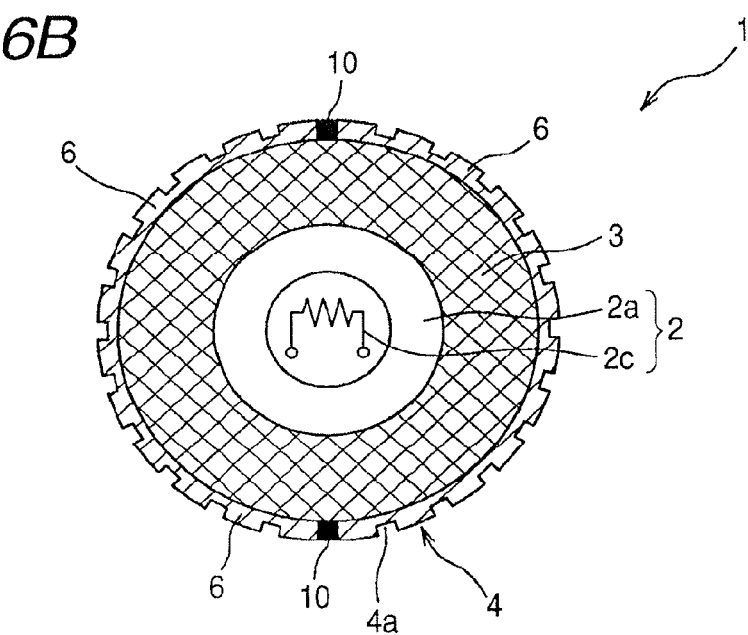
Figure 7A:
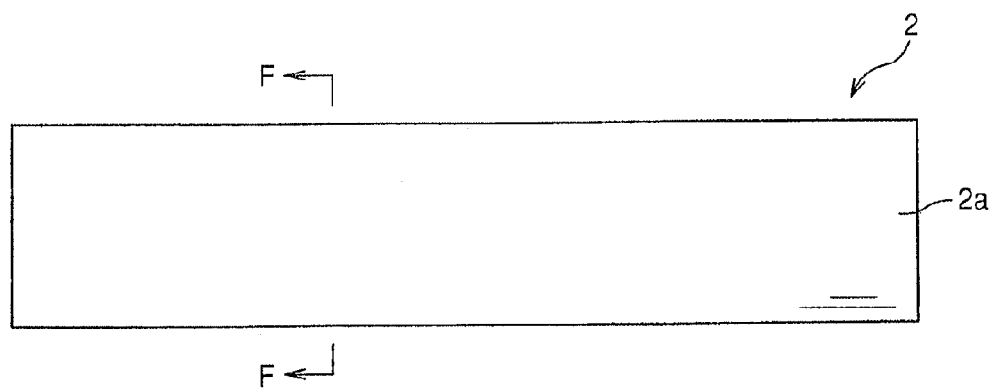
FIG. 7A is a front view of the fine pattern mold, being produced, of Embodiment 3 of the present invention
Figure 7B:
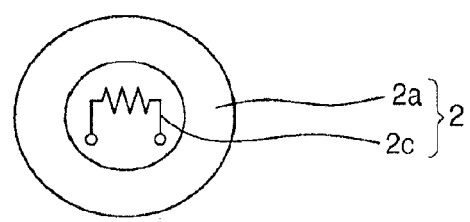
FIG. 7B is a F-F sectional view of FIG. 7A.
Figure 8A:
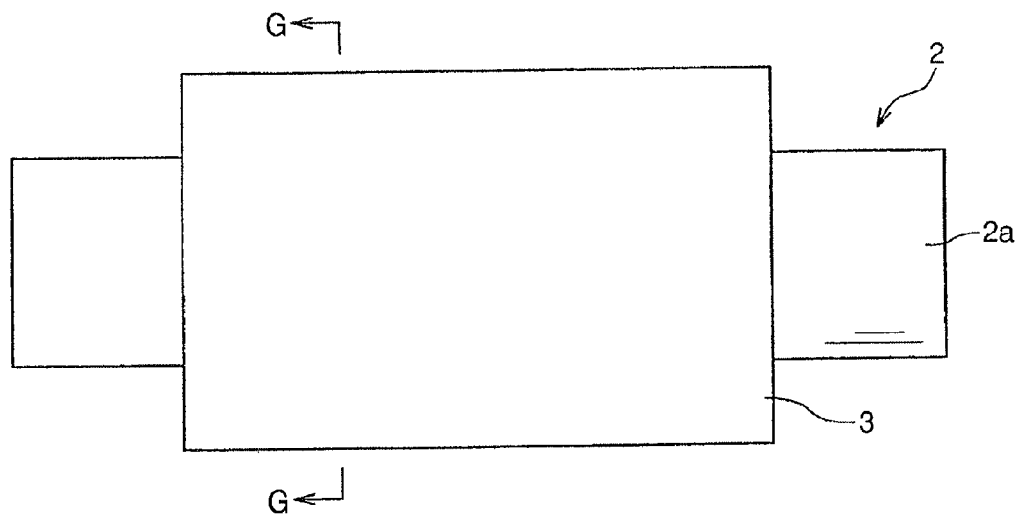
FIG. 8A is a front view of the fine pattern mold, being produced, of Embodiment 3 of the present invention
Figure 8B:
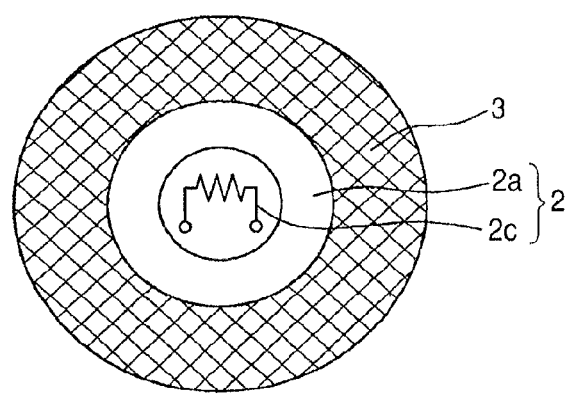
FIG. 8B is a G-G sectional view of FIG. 8A.

Next, a production method of a fine pattern mold according to Embodiment 3 will be described. First, a roll 2 shown in FIGS. 7A and 7B is prepared. Next, as shown in FIGS. 8A and 8B, on a peripheral surface of a main part 2a of the roll 2, the buffer tube 3 is formed all over the periphery by the heat-resistant engineering plastic. Finally, as shown in FIGS. 6A and 6B, the stamper tube 4 is fitted in the buffer tube 3.

As in Embodiment 1, according to Embodiment 3, the buffer tube 3 can be expanded/contracted with a change in temperature, and can be contracted and deformed in accordance with the contraction. Therefore, an effect similar to the one in Embodiment 1 can be obtained.

If seen differently, it can be considered that, with respect to Embodiment 1, in Embodiment 3, the material of the main part 2a (see FIG. 1B) of the roll was changed so that it might be the same as that of the buffer tube 3. If thinking this way, the material of the entire roll 2 including the roll shaft 2b can be changed so that it may be the same as that of the buffer tube 3. In such a change, the coefficients of the linear expansion of the buffer tube 3 and the roll 2 may be set such that they are larger than that of the stamper tube 4 and smaller than that of the buffer tube 3 of Embodiment 3.

Also, the elastic modulus of the buffer tube 3 and the roll 2 may be set to be smaller than that of the stamper tube 4 and larger than that of the buffer tube 3 of Embodiment 3.

Next, a production method of a fine pattern mold according to Embodiment 4 will be described. The difference between the production method of the fine pattern mold of Embodiment 4 and the production method of the fine pattern mold of Embodiment 1 is a production method of the stamper tube 4 alone. Therefore, the production method of the stamper tube 4 will be explained.

First, as in Embodiment 1, a stamper sheet 6 is formed.

Figure 9A:
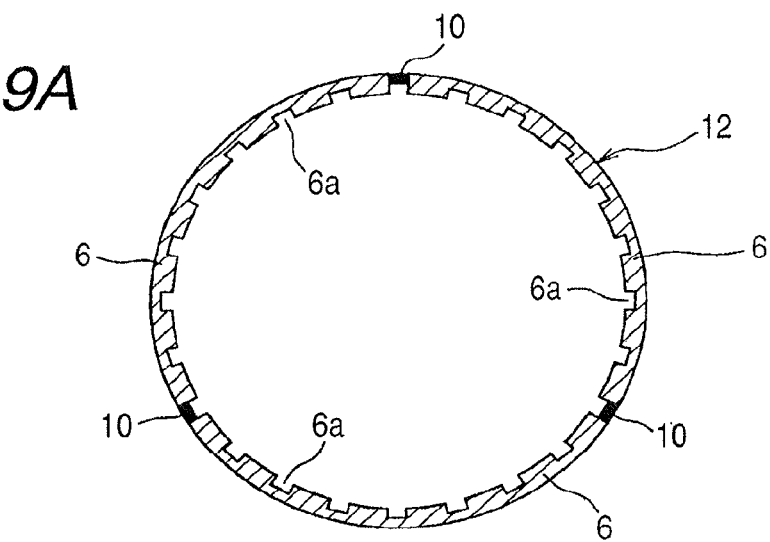
FIG. 9A is a view for illustrating a production method of a fine pattern mold of Embodiment 4 of the present invention, which is a sectional view of a master stamper tube.

Next, as shown in FIG. 9A, two or more stamper sheets 6 are joined in a peripheral direction so that the surface on which a concave/convex pattern 6a is formed becomes an inner peripheral surface, and the master stamper tube 12 is formed. The difference between the formation of the master stamper tube 12 and the formation of the stamper tube 4 in Embodiment 1 is that the concave/convex pattern 6a of the stamper sheet 6 is formed on the inner peripheral surface of the tube (Embodiment 4) or on the outer peripheral surface (Embodiment 1). Therefore, in the master stamper tube 12, the stamper sheets 6 are joined by the joint 10.

Figure 9B:
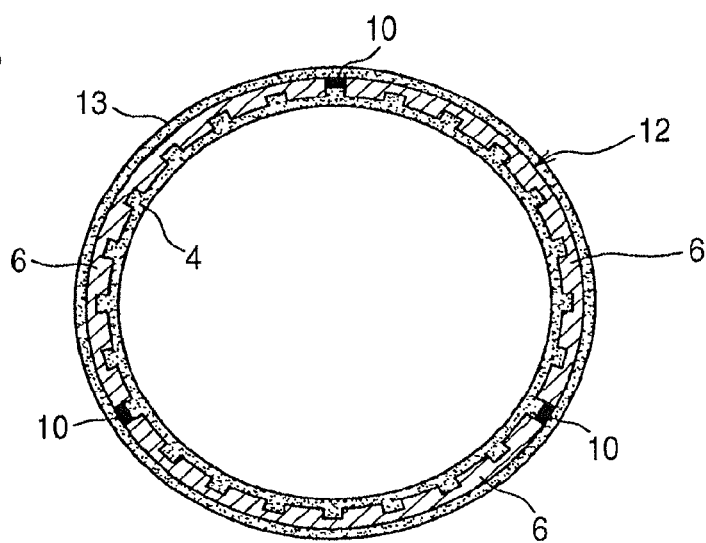
FIG. 9B is a view for illustrating the production method of the fine pattern mold of Embodiment 4 of the present invention, which is a sectional view of the master tube and the stamper tube.

Next, as shown in FIG. 9B, a masking tape 13 for plating is stuck all over the peripheral surface of the master stamper tube 12. Then, by electroless plating and electrolytic plating, a stamper tube (electroformed tube) 4 is formed on the inner peripheral surface of the master stamper tube 12. In the formation of the stamper tube 4, the concave/convex pattern 4a is replicated on the peripheral surface of the stamper tube 4.

Figure 9C:
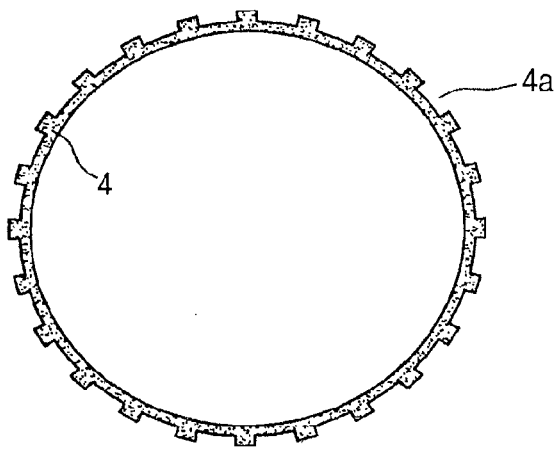
FIG. 9C is a view for illustrating the production method of the fine pattern mold of Embodiment 4 of the present invention, which is a sectional view of the stamper tube.

Finally, the stamper tube 4 is removed from the master stamper tube 12, and the stamper tube 4 is completed as shown in FIG. 9C.

If the stamper tube 4 is produced as in Embodiment 4, the seamless stamper tube 4 without the joint 10 can be formed.

As shown in FIG. 2A, first, as a master plate 5, a silicon wafer of 8 inches where there is provided a via (hole) of 200 nm in diameter and 300 nm in depth in the surface is prepared.

After forming a palladium catalyst layer (Neogant 834; made by Adtec, Inc.) for electroless plating and activating it, it was immersed for three minutes in the electroless-nickel plating liquid (Top chemi-alloy 66; made by Okuno Chemical Industries Co., Ltd.) at 60° C., and the electroless nickel-plated layer 6b was formed on the surface.

As shown in FIG. 2B, the stamper sheet 6 was peeled from the master plate 5, cut and shaped into ones each having dimension of 115 mm (short side)×120 mm (long side). Thus, three stamper sheets 6 were prepared.

As shown in FIG. 2C, after arranging these three stamper sheets 6 to join them in a long side direction with a gap 7 of 200 μm, they are fixed in a cylindrical shape by a conductive tape 8 (No. 1245; made by Sumitomo 3M Limited). Next, with a masking tape 9 (No. 851T; made by Sumitomo 3M Limited) for plating, the area other than the gap 7 was masked to expose the gap 7 alone.

As shown in FIG. 2D, by using the same nickel sulfamate plating bath as the above, the gap 7 exposed by the electrolysis nickel plating was filled with nickel and joined. Then, the masking tape 9 for plating and the conductive adhesive tape 8 were peeled off, the joint 10 was shaped, and the stamper tube 4 of 345.6 mm in inner peripheral length was completed.

Next, as shown in FIGS. 3A and 3B, a SUS304 material was cut, and the roll 2 which has the roll shaft 2b in its main part 2a of 100 mm in diameter and 130 mm in width was produced.

Next, after applying a primer agent of silicone system (No. 10B; made by Shin-Etsu Silicone Co., Ltd.) to a peripheral surface of the main part 2a of the roll and drying it for 20 minutes at a room temperature, pretreatment of heating in an oven for 20 minute at 150° C. was performed. Next, 0.5 weight part of a curing agent (TC-8) was given to a Milable silicone rubber (XE20-A2156; made by Momentive Performance Materials Co.), kneaded by using a kneader, and a silicone rubber composite was prepared. Next, the roll 2 and the silicone rubber composite were arranged in a compression-molding die having a tubular-type cavity, and the primary cure of 10 minutes was performed on it at 170° C.

Then, it was put in the oven, the secondary cure of 4 hours was performed on it at 200° C., and the buffer tube 3 of a silicone elastomer was formed. Finally, the buffer tube 3 was ground by a cylindrical grinder and the buffer tube 3 with a thickness of 5 mm was completed.

Next, the roll 2 in which the buffer tube 3 was formed was cooled at −50° C. With the buffer tube 3 contracted, the stamper tube 4 was fitted over the buffer tube 3. Then, its temperature was returned to the room temperature, the buffer tube 3 was expanded, and the stamper tube 4 was fixed to the buffer tube 3.

In addition, the coefficient of linear expansion of the stamper tube 4 was 11 ppm/K, and the elastic modulus was 207 GPa. On the other hand, the coefficient of linear expansion of the buffer tube 3 was 210 ppm/K, and the elastic modulus was 5.4 MPa. It is seen that the buffer tube 3 has a larger coefficient of linear expansion and a smaller elastic modulus than those of the stamper tube 4.

Finally, a coil to be an induction-heating mechanism 2c was built into the roll 2 to complete the fine pattern mold 1 of Embodiment 1.

Next, an experiment of transferring a pattern to a film was conducted by using the fine pattern mold 1 of Example 1. A polystyrene sheet of 120 mm in width and 400 μm in thickness was used for the film. A fine concave/convex pattern was pressed and transferred to the film by arranging a pressure roller so that the fine pattern mold 1 and the rotation shaft are in parallel and by feeding the film between the rotated fine pattern mold 1 and the pressure roller. As for detailed transfer conditions, the surface temperature of the fine pattern mold 1 and the pressure roller was 150° C., the transfer pressure was 1.2 MPa, and a feed rate was 600 mm/min.

Regarding a via (hole) pattern formed in the film, diameters and depths are measured and evaluated at a matrix of 3 spots with respect to a width direction of the film and 4 spots with respect to a feeding direction, that is, 12 spots in all. An atomic force microscope (NanoScope D5000; made by Veeco Inc.) was used for evaluation. The evaluation of transferability was conducted such that a result was regarded as good when there were 10 or more spots out of 12 spots where dimension errors of measured values of the diameters and depths are within ±10% from a designed value (200 nm in diameter, 300 nm in depth).

At all 12 evaluation spots, dimension errors were within ±10%, and results of the evaluation of Example 1 were found good. The evaluation results showed that the precise continuous transfer of the pattern was possible by using the fine pattern mold 1 of Example 1 and, further, of Embodiment 1. The evaluation results are shown in Table 1.

TABLE 1

|  |  | Example 1 | Example 2 | Example 3 | Example 4 | Example 5 | Example 6 | Comparative example 1 | Comparative example 2 |
|---|---|---|---|---|---|---|---|---|---|
| Stamper tube | Coefficient of linear expansion | 11 ppm/K | 11 ppm/K | 11 ppm/K | 11 ppm/K | 11 ppm/K | 11 ppm/K | 11 ppm/K | 11 ppm/K |
|  | Elastic modulus | 207 GPa | 207 GPa | 207 GPa | 207 GPa | 207 GPa | 207 GPa | 207 GPa | 207 GPa |

TABLE 1-continued

|  |  | Example 1 | Example 2 | Example 3 | Example 4 | Example 5 | Example 6 | Comparative example 1 | Comparative example 2 |
|---|---|---|---|---|---|---|---|---|---|
| Buffer tube | Coefficient of linear expansion | 210 ppm/K | 210 ppm/K | 57 ppm/K | 210 ppm/K | 210 ppm/K | 57 ppm/K | — | — |
|  | Elastic modulus | 5.4 MPa | 5.4 MPa | 4.2 GPa | 5.4 MPa | 5.4 MPa | 4.2 GPa | — | — |
| Transferability |  | good | good | good | good | good | good | poor | poor |
| Continuity of patterns |  | ○ | ○ | ○ | ○ | ○ | ○ | ○ | x |

Figure 5A:
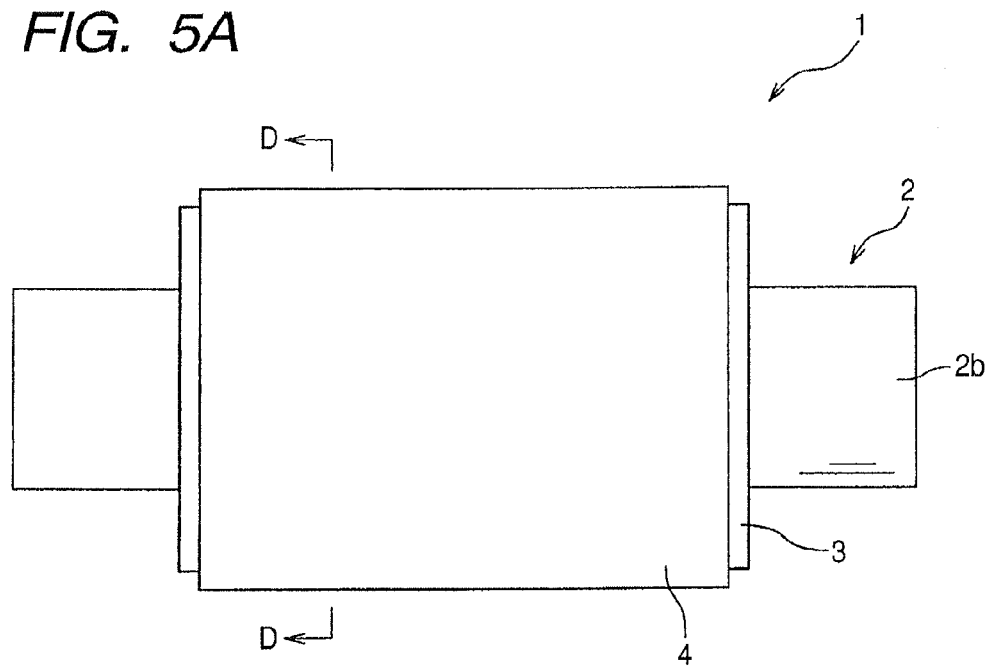
FIG. 5A is a front view of a fine pattern mold of Embodiment 2 of the present invention.
Figure 5B:
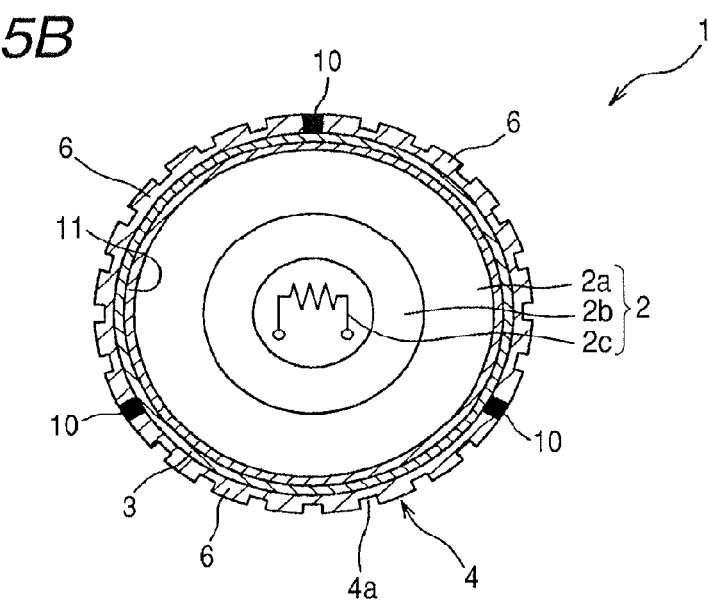
FIG. 5B is a D-D sectional view of FIG. 5A.

As shown in FIG. 5B, a nickel hard coat layer 11 was formed on a peripheral surface of a main part 2a of a roll having a thickness of about 10 μm by electrolytic plating for the purpose of flattening (mirror polishing) of the peripheral surface of the main part 2a of the roll. Rest of the production method is the same as that of Example 1, and the fine pattern mold 1 of Example 2 was completed.

Next, by using the fine pattern mold 1 of Example 2, an experiment of transferring a pattern to a film was conducted. A method of the transfer experiment and an evaluation method of transferability were the same as those of Example 1. As a result of the transfer evaluation of the fine pattern mold 1 of Example 2, at all 12 evaluation spots, dimension errors were within ±10%, and the evaluation results were found good. The evaluation results showed that it was possible to continuously transfer the pattern accurately by using the fine pattern mold 1 of Example 2 and, further, of Embodiment 2. The evaluation results are shown in Table 1.

In the same manner as in Example 1, two stamper sheets 6 were prepared by cutting a sheet into ones each having a size of 78 mm (short side)×120 mm (long side) and shaping them. Moreover, by the same method as in Example 1, the gap 7 of 0.5 mm was filled by plating and a stamper tube 4 of 157 mm in inner peripheral length was completed.

Next, as shown in FIGS. 7A and 7B, the SUS304 material was cut and processed to prepare a roll 2 having a main part 2a of the roll of 20 mm in inner diameter, 30 mm in outside diameter, and 190 mm in width.

Next, a polyimide resin (UPIMOL-R; made by Ube Industries, Ltd.) was processed into one having an inner diameter of 30 mm, an outside diameter of 50 mm, and a width of 130 mm to complete the buffer tube 3.

Also, the stamper tube 4 had a coefficient of linear expansion of 11 ppm/K and an elastic modulus of 207 GPa. On the other hand, the buffer tube 3 had a coefficient of linear expansion of 57 ppm/K and an elastic modulus of 4.2 GPa. It is seen that the buffer tube 3 had a larger coefficient of linear expansion and a smaller elastic modulus than those of the stamper tube 4.

Moreover, the coefficient of linear expansion 57 ppm/K of the buffer tube 3 of Example 3 is smaller than the coefficient of linear expansion 210 ppm/K of the buffer tube 3 of Example 1. The elastic modulus 4.2 GPa of the buffer tube 3 of Example 3 was larger than the elastic modulus 5.4 MPa of the buffer tube 3 of Example 1.

Next, by using the fine pattern mold 1 of Example 3, an experiment to transfer a pattern to a film was conducted. A method of the transfer experiment and a transfer valuation method were the same as those in Example 1. The evaluation results showed that, at all 12 evaluation spots, dimension errors were within ±10%, and the results were found good. The evaluation results showed that, by using the fine pattern mold 1 of Example 3 and, further, of Embodiment 3, it was possible to continuously transfer the pattern accurately. The evaluation results are shown in Table 1.

First, in the same manner as in Example 1, a stamper sheet 6 was prepared. Next, as shown in FIG. 9A, in order that a fine concave/convex pattern 6a might be formed inside, a master stamper tube 12 was prepared according to the method of Example 1.

Next, as shown in FIG. 9B, an outer peripheral surface of the master stamper tube 12 was masked with a masking tape 13 for plating. Then, the master stamper tube 12 was immersed in concentrated hydrochloric acid of 15° C. for several seconds, and a natural oxidation film on the surface was removed. Then, it was immersed for 30 seconds in a solution of potassium dichromate of 2 g/l at a room temperature.

After that, the master stamper tube 12 was washed, and an oxide film for peeling was formed on a surface (inner peripheral surface) of the master stamper tube 12. Next, in the same nickel sulfamate plating bath as in Example 1, electrolysis nickel plating was performed, first, for 100 minutes by 0.1 A/dm$^2$, second, for 60 minutes by 1.5 A/dm$^2$ and, finally, for 60 minutes by 3 A/dm$^2$. Thus, an electrolysis nicked-plated layer to be a stamper tube 4 was formed.

Finally, as shown in FIG. 9C, the stamper tube 4 was peeled from the master stamper tube 12 to complete the stamper tube 4 of Example 4. Then, by using the stamper tube 4 of Example 4, according to the production method of the fine pattern mold of Example 1, the fine pattern mold of Example 4 was completed.

Next, by using the fine pattern mold of Example 4, an experiment of transferring a pattern to a film was conducted. A method of the transfer experiment and an evaluation method of transferability were the same as in Example 1, except that a feeding rate of the film alone was changed from 600 mm/min to 400 mm/min.

At all 12 evaluation spots, dimension errors in the transferability of the fine pattern mold of Example 4 were ±10%, and the results were found good. The evaluation results showed that, by using the fine pattern mold of Example 4 and, further, of Embodiment 4, it was possible to continuously transfer the pattern accurately. The evaluation results are shown in Table 1.

Next, by using the fine pattern mold of Example 5, an experiment to transfer a pattern to a film was conducted. A method of the transfer experiment and an evaluation method of transferability were the same as those in Example 1, except that a feeding rate of the film alone was changed from 600 mm/min to 400 mm/min.

As for the evaluation results of the transferability of the fine pattern mold of Example 5, dimension errors were within ±10% at all 12 evaluation spots, and the results were found good. The evaluation results showed that, by using the fine pattern mold of Example 5, it was possible to continuously transfer the pattern accurately. The evaluation results are shown in Table 1.

Next, by using the fine pattern mold of Example 6, an experiment to transfer a pattern to a film was conducted. A method of the transfer experiment and an evaluation method of transferability were the same as those in Example 1, except that a feeding rate of the film alone was changed from 600 mm/min to 400 mm/min.

As for the evaluation results of the transfer of the fine pattern mold of Example 6, dimension errors were within ±10% at all 12 evaluation spots, and the results were found good. The evaluation results showed that, by using the fine pattern mold of Example 6, it was possible to continuously transfer the pattern accurately. The evaluation results are shown in Table 1.

Next, by using the fine pattern mold of Comparative example 1, an experiment of transferring a pattern to a film was conducted. A method of the transfer experiment and an evaluation method of transferability were the same as in Example 1.

As for the evaluation results of the transfer of the fine pattern mold of Comparative example 1, at 4 spots near the central portion in a width direction, dimension errors were not within ±10%, and the results were found poor. However, as for patterns at portions of both ends, the patterns were formed continuously which satisfied quality standards. The evaluation results are shown in Table 1.

Then, by using the fine pattern mold of Comparative example 2, an experiment of transferring a pattern to a film was conducted. A method of the transfer experiment and an evaluation method of transferability were the same as in Example 1.

As for the evaluation result of the transfer of the fine pattern mold of Comparative example 1, at 4 spots near a central portion in a width direction, dimension errors were not within ±10%, and the results were found poor. Furthermore, there took place a fracture at a portion of the film in contact with the mold fixing jig, and patterns could not be formed continuously. The results are shown in Table 1.

What is claimed is:

1. A method for producing a fine pattern mold, comprising the steps of:
    forming a stamper tube having a fine concave/convex pattern on its outer peripheral surface;
    forming a buffer tube, on a peripheral surface of a roll, having a larger coefficient of linear expansion and a smaller elastic modulus than those of said stamper tube;
    fitting said stamper tube onto said buffer tube while cooling said buffer tube;
    forming a stamper sheet on a master plate having said concave/convex pattern on its surface and replicating said concave/convex pattern on two or more said stamper sheets;
    joining two or more said stamper sheets in a peripheral direction such that said surface on which said concave/convex pattern is formed will become an outer peripheral surface; and
    wherein the joining of the two or more said stamper sheets is achieved by and electrolytic plating process.

2. A method for producing a fine pattern mold according to claim 1 in which said concave/convex pattern is replicated on said stamper sheet, comprising the steps of:
    forming an electroformed layer to be said stamper sheet on said master plate; and
    peeling said electroformed layer from said master plate.

3. A method for producing a fine pattern mold according to claim 2 in which two or more said stamper sheets are joined in a peripheral direction, comprising the steps of:
    shaping said electroformed layer; and
    wherein the joining of the two or more said stamper sheets includes fixing end faces of said electroformed layer while allowing them to confront with each other by a conductive member.

* * * * *